(12) United States Patent
Tsuchiya

(10) Patent No.: US 7,275,297 B2
(45) Date of Patent: Oct. 2, 2007

(54) DEVICE FOR ATTACHING LEADER PIN, DEVICE FOR PROCESSING END PORTION OF TAPE TYPE RECORDING MEDIUM, AND METHOD FOR ATTACHING LEADER PIN

(75) Inventor: Hiroyuki Tsuchiya, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 0 days.

(21) Appl. No.: 11/327,466

(22) Filed: Jan. 9, 2006

(65) Prior Publication Data

US 2006/0180692 A1    Aug. 17, 2006

(30) Foreign Application Priority Data

Feb. 17, 2005  (JP) ............... 2005-041388

(51) Int. Cl.
  G11B 23/113  (2006.01)
  G11B 23/107  (2006.01)
  G11B 23/08   (2006.01)
(52) U.S. Cl. ............... 29/564.7; 29/33 K; 360/132; 242/333.4; 156/157
(58) Field of Classification Search ............... 29/564.7, 29/33 K, 425, 428, 563, 806, 564.1, 564.2, 29/564.4, 564.6, 564.8; 360/132; 242/333.4; 156/157, 159, 304.3, 304.5, 306.3
See application file for complete search history.

(56) References Cited

U.S. PATENT DOCUMENTS 3,717,923 A * 2/1973 Arai et al. ............... 29/429
4,114,252 A * 9/1978 Kon et al. ............... 29/563
5,807,459 A * 9/1998 Merle ............... 156/344
6,349,016 B1 * 2/2002 Morita et al. ............... 360/132
6,462,906 B2 * 10/2002 Morita et al. ............... 360/132
6,629,656 B2 * 10/2003 Morita et al. ............... 242/332.4
6,745,967 B2 * 6/2004 Morita et al. ............... 242/332.4
6,896,217 B1 * 5/2005 Ishikawa et al. ............... 242/348
6,926,220 B2 * 8/2005 Hiraguchi ............... 242/348.2
6,938,848 B2 * 9/2005 Morita et al. ............... 242/332.4
6,945,489 B2 * 9/2005 Anderson et al. ............... 242/348
6,953,170 B2 * 10/2005 Morita et al. ............... 242/332.4
6,994,287 B2 * 2/2006 Okamura et al. ............... 242/348.2
7,000,862 B2 * 2/2006 Takahashi ............... 242/348.2

(Continued)

FOREIGN PATENT DOCUMENTS

JP   2003-338159 A    11/2003
JP   2003338160 A  *  11/2003

*Primary Examiner*—Dana Ross
(74) *Attorney, Agent, or Firm*—Sughrue Mion Pllc.

(57) ABSTRACT

A leader pin attaching device for attaching a leader pin to a pin attachment portion of the leader tape (a device for processing end portion of tape type recording medium) is provided. The device includes a transport suction block for holding a portion of the leader tape by negative pressure with the pin attachment portion of the leader tape being protruded; a clamper mechanical part for engaging the leader pin and a leader pin clip with the pin attachment portion of the leader tape being sandwiched therebetween. The transport suction block holds the leader tape in such manner that the leader tape is allowed to move in machine direction during the engagement of the leader pin and the leader pin clip with the pin attachment portion sandwiched therebetween. With the use of the device, wrinkle formation is prevented when a leader pin is attached to a tape.

13 Claims, 5 Drawing Sheets

U.S. PATENT DOCUMENTS

| | | | |
|---|---|---|---|
| 7,077,352 B2 * | 7/2006 | Ishikawa et al. | 242/338.1 |
| 7,086,623 B2 * | 8/2006 | Sato et al. | 242/348.2 |
| 2002/0097523 A1 * | 7/2002 | Morita et al. | 360/132 |
| 2003/0189119 A1 * | 10/2003 | Morita et al. | 242/332.4 |
| 2005/0127223 A1 * | 6/2005 | Ishikawa et al. | 242/338.1 |

* cited by examiner

DEVICE FOR ATTACHING LEADER PIN, DEVICE FOR PROCESSING END PORTION OF TAPE TYPE RECORDING MEDIUM, AND METHOD FOR ATTACHING LEADER PIN

CROSS-REFERENCE TO RELATED APPLICATIONS

This application claims the foreign priority benefit under Title 35, United States Code, § 119 (a)-(d), of Japanese Patent Application No. 2005-41388, filed on Feb. 17, 2005 in the Japan Patent Office, the disclosure of which is herein incorporated by reference in its entirety.

BACKGROUND OF THE INVENTION

1. Field of the Invention

The present invention relates to a device for attaching a leader pin to an end portion of a tape type recording medium, a device for processing an end portion of a tape type recording medium, and a method for attaching a leader pin to an end portion of a tape type recording medium.

2. Description of the Related Art

As an external recording media used for data backup in computer or the like, a magnetic tape cartridge that complies with the LTO (Linear Tape Open) standard has been known. This type of magnetic tape cartridge is formed of a cartridge case containing components including a single reel around which a magnetic tape is wound, and a draw-out opening for magnetic tape is formed in a side wall of the case. To an end of the magnetic tape, a leader tape is joined by means of a splicing tape, and to an end portion of the leader tape, a leader pin for drawing out the magnetic tape from the draw-out opening of the cartridge is attached, through engagement of the leader pin with a leader pin clip. Both ends of the leader pin are supported by leader pin springs provided in the area around the draw-out opening of the cartridge case.

As a device for attaching a leader pin to an end portion of a leader tape, there can be mentioned a device described in Japanese Patent Application JP2003-338159A (particularly paragraphs 0011-0034 and FIG. 3), which includes a splice mechanical part for joining an end of a magnetic tape to one end of a leader tape; a transport suction mechanical part for holding the leader tape joined to the magnetic tape by negative pressure and transporting the leader tape, with the other end of the leader tape being protruded; and a damper mechanical part for engaging a bar-shaped leader pin with a leader pin clip having C-shaped cross section with the protruded end of the transported leader tape being sandwiched therebetween.

When the above-mentioned magnetic tape cartridge is loaded in the drive and operated, the magnetic tape is drawn out from the magnetic tape cartridge and wound around a take-up reel in the drive. Since there is a step between a hub periphery of the take-up reel and a notch formed in the hub periphery for receiving the leader pin, the wound magnetic tape is likely to have a fold line, which is known as "reel fold." In order to overcome this problem, the conventional leader tapes have been replaced by a leader tape having larger thickness and larger surface roughness.

However, the magnetic tape with the leader tape recently introduced has a problem in that, when the end portion of the leader tape is sandwiched between the leader pin and the leader pin clip, the leader tape LT tends to have wrinkle W, as shown in FIG. 6. The presence of wrinkle W in the leader tape LT may result in rupture of the leader tape LT due to stress concentrated on the wrinkle W, after repeated use of the magnetic tape cartridge.

Therefore, it would be desirable to provide a device for attaching a leader pin to a tape type recording medium, a device for processing an end portion of a tape type recording medium, and a method for attaching a leader pin to a tape type recording medium, which prevent wrinkle formation when the leader pin is attached to the tape type recording medium.

The present inventor made intensive and extensive studies with the view towards elucidating the cause of wrinkle formation. As a result, the inventor concluded that a main reason for the wrinkle formation in the leader tape lies in the fact that the leader tapes recently introduced have larger ratio (MD/TD) of an elastic coefficient in machine direction (MD) of the tape to an elastic coefficient in transverse direction (TD), than the conventional leader tapes have.

Specifically, the leader tape introduced recently has a larger elastic coefficient in machine direction than elastic coefficient in transverse direction to some extent. When the bar-shaped leader pin and a leader pin clip having C-shaped cross section are engaged together with the leader tape being sandwiched therebetween, a pulling force is applied to the leader tape. Since the leader tape introduced recently has a larger elastic coefficient in machine direction, the recent leader tape is likely to stretch in transverse direction or oblique direction relative to machine direction, and thus the leader tape may be stretched in transverse direction or oblique direction during the attachment of the leader pin to the leader pin clip, which is believed to cause wrinkle formation. The present invention is made based on this finding.

SUMMARY OF THE INVENTION

According to one aspect of the present invention, there is provided a device for attaching a leader pin to a pin attachment portion of a leader tape having a joint end and a free end opposite to the joint end, which joint end is to be joined to a joint end of a tape type recording medium and which pin attachment portion is located in the vicinity of the free end, the device including: a suction mechanical part configured to hold a portion of the leader tape by negative pressure, which portion is located on the joint end side relative to the pin attachment portion; a damper mechanical part configured to engage the leader pin and a leader pin clip with the pin attachment portion of the leader tape being sandwiched therebetween, wherein the suction mechanical part holds the leader tape in such manner that the leader tape is allowed to move in machine direction during the engagement of the leader pin and the leader pin clip with the pin attachment portion of the leader tape being sandwiched therebetween.

In the present specification, the expression "pin attachment portion" refers to a portion of the leader tape in the vicinity of a free end opposite to the end (to be) joined to the tape type recording medium; and the expression "free end" refers to an end of the leader tape which is opposite to the end joined to the tape type recording medium and is not (to be) joined to any tape type recording medium.

With this configuration, the suction mechanical part holds the leader tape in such manner that the leader tape is allowed to move in machine direction during the engagement of the leader pin and the leader pin clip with the pin attachment portion of the leader tape being sandwiched therebetween. For this reason, during the engagement of the leader pin with the leader pin clip, the leader tape is pulled and moved in machine direction. As a result, the leader tape does not suffer stress concentrated in transverse direction or oblique direction, and thus deformation of the leader tape is suppressed, which prevents wrinkle formation.

The use of the device for attaching a leader pin is preferable, especially in the case of the leader tape having a larger elastic coefficient in machine direction than in transverse direction.

The suction mechanical part may preferably but not necessarily be configured to hold the leader tape with a suction power that generates a predetermined tensile strength or pulling-resistance force when the leader tape is pulled in machine direction. The tensile strength or pulling resistance force may preferably but not necessarily be in the range of 0.3-1.4 N as shown in Table 2, for example.

The suction mechanical part may preferably but not necessarily be supported by elastic body which allows the suction mechanical part to move in machine direction of the leader tape, the elastic body having an elastic coefficient that allows the elastic body to elastically support the suction mechanical part while maintaining a predetermined tensile force generated on the leader tape during the engagement of the leader pin and the leader pin clip with the pin attachment portion of the leader tape being sandwiched therebetween.

The suction mechanical part may preferably but not necessarily be transported in machine direction of the leader tape by a transport mechanism, which transports the suction mechanical part while maintaining a predetermined tensile force generated on the leader tape during the engagement of the leader pin and the leader pin clip with the pin attachment portion of the leader tape being sandwiched therebetween.

In the present specification, the expression "tensile strength" or pulling-resistance force means a magnitude of force obtained at the moment when the leader tape starts moving, under the condition that the leader tape is held by the suction mechanical part by negative pressure and pulled with gradually augmented pulling force in the direction parallel to the holding surface.

The studies of the inventor elucidated that wrinkle is formed during the engagement of a leader pin clip with a leader pin under the condition where the leader tape is held by negative pressure in such manner that a pulling-resistance force, of more than 1.4 N newtons) is generated; in contrast, under the condition where this pulling force is less than 0.3 N, the leader tape cannot be held steadily and the leader tape may be detached from the suction mechanical part during operation. The relationship between pulling-resistance force and suction power can be obtained by preliminary experiment or the like.

It was also found that, in the case where suction power of the suction mechanical part is set so as to obtain a pulling-resistance force in the above-mentioned value range, when a leader pin is attached to a conventional leader tape, wrinkle is hardly formed. In other words, when the leader pin and the leader pin clip are engaged with each other with a pulling-resistance force outside the above-mentioned range, even a slight misalignment between the leader pin and the leader pin clip leads to wrinkle formation in the conventional leader tape. However, when the above-mentioned setting is introduced, tolerance to misalignment becomes large. Even a presence of larger misalignment than the misalignment that causes problem in the conventional case does not form wrinkle. For this reason, the failure of attachment of leader pin is prevented, which in turn enhances productivity.

In the case of the leader tape having a larger elastic coefficient in machine direction than in transverse direction, the device for attaching leader pin of the present invention is preferably used. The leader tape may preferably but not necessarily have an elastic coefficient in transverse direction of 0.95-0.78, taking the elastic coefficient in machine direction as 1.0. The leader tape may preferably but not necessarily have a surface roughness of 10-60 nm. The leader tape may preferably but not necessarily have a thickness of 5-20 μm.

In another aspect of the present invention, there is provided a device for processing an end portion of a tape type recording medium including: a splice mechanical part configured to cut a tape type recording medium drawn from a reel and an end portion of a leader tape to form joint ends, to butt the joint end of the tape type recording medium to the joint end of the leader tape, to join the butted joint ends with a splicing tape, and to cut the joined leader tape to a predetermined length to form a free end opposite to the joint end of the leader tape; a transport suction mechanical part configured to transport the leader tape, which has a suction member for holding a portion of the leader tape by negative pressure, the portion being located on the joint end side relative to a pin attachment portion of the leader tape in the vicinity of the free end, and which transports the leader tape from the splice mechanical part to a damper mechanical part by moving the suction member; and a damper mechanical part configured to engage the leader pin clip and the leader pin with each other with the pin attachment portion of the transported leader tape, wherein the transport suction mechanical part holds the leader tape by negative pressure in such manner that the leader tape is allowed to move in machine direction during the engagement of the leader pin and the leader pin clip with the pin attachment portion of the leader tape being sandwiched therebetween.

With this configuration, the transport suction mechanical part holds the leader tape by negative pressure in such manner that the leader tape is allowed to move in machine direction during the engagement of the leader pin and the leader pin clip with the pin attachment portion of the leader tape being sandwiched therebetween. For this reason, during the engagement of the leader pin with the leader pin clip, the leader tape is pulled and moved in machine direction. As a result, the leader tape does not suffer stress concentrated in transverse direction or oblique direction relative to the machine direction, and thus deformation of the leader tape is suppressed, which prevents wrinkle formation.

The transport suction mechanical part may preferably, but not necessarily, further comprise a suction power control unit configured to control suction power of the suction member in such manner that a suction power during the engagement of the leader pin and the leader pin clip with the pin attachment portion of the leader tape being sandwiched therebetween becomes smaller than a suction power during the transport of the leader tape from the splice mechanical part to the damper mechanical part.

With this configuration, the transport suction mechanical part further comprises the suction power control unit for controlling suction power of the suction member. For this reason, varied suction power can be applied upon transporting the tape and upon engaging the pin with the clip. Therefore, during the transport of the tape, the suction power can be enhanced so that the leader tape is not detached; and during the engagement of the pin with the clip, the suction power can be lowered so that wrinkle is not formed in the leader tape.

In still another aspect of the present invention, there is provided a method for attaching a leader pin to a pin attachment portion of a leader tape having a joint end and a free end opposite to the joint end, which joint end is to be joined to a joint end of a tape type recording medium and which pin attachment portion is located in the vicinity of the free end and, with a use of a device including a suction mechanical part configured to hold a portion of the leader tape by negative pressure, which portion is located on the joint end side relative to the pin attachment portion of the leader tape, and a damper mechanical part configured to engage the leader pin and a leader pin clip with the pin attachment portion of the leader tape being sandwiched therebeteen, which method comprises: a first step in which the pin attachment portion of the leader tape is disposed between the leader pin and the leader pin clip which are held by the damper mechanical part, a second step in which the leader pin and the leader pin clip are engaged with each other with the pin attachment portion of the leader tape being sandwiched therebetween, wherein in the second step a portion of the leader tape held by the suction mechanical part is moved towards the leader pin during the engagement of the leader pin and the leader pin clip with the pin attachment portion of the leader tape being sandwiched therebetween.

With this method, a portion of the leader tape held by the suction mechanical part is moved towards the leader pin during engagement of the leader pin and the leader pin clip with the pin attachment portion of the leader tape being sandwiched therebetween. For this reason, the tensile force caused in the leader tape is released, and excessive tensile force is prevented, which in turn avoids deformation or wrinkle formation on the leader tape.

According to the present invention, there are provided a device for attaching a leader pin, a device for processing an end portion of a tape type recording medium, and a method for attaching a leader pin, which prevent wrinkle formation when a leader pin is attached to a tape type recording medium. With the use of these devices and method, products are prevented from being defective, and productivity of the tape type recording medium cartridge can be improved.

BRIEF DESCRIPTION OF THE DRAWINGS

The various aspects, other advantages and further features of the present invention will become more apparent by describing in detail illustrative, non-limiting embodiments thereof with reference to the accompanying drawings. In the present specification, the same components are designated with the same reference characters, and thus a duplicate description is omitted. The running direction or longitudinal direction of the tape is referred to as "machine direction", and the direction perpendicular to the machine direction on the same plane (tape surface) is referred to as "transverse direction".

DETAILED DESCRIPTION OF THE EXEMPLARY EMBODIMENTS

Figure 1:
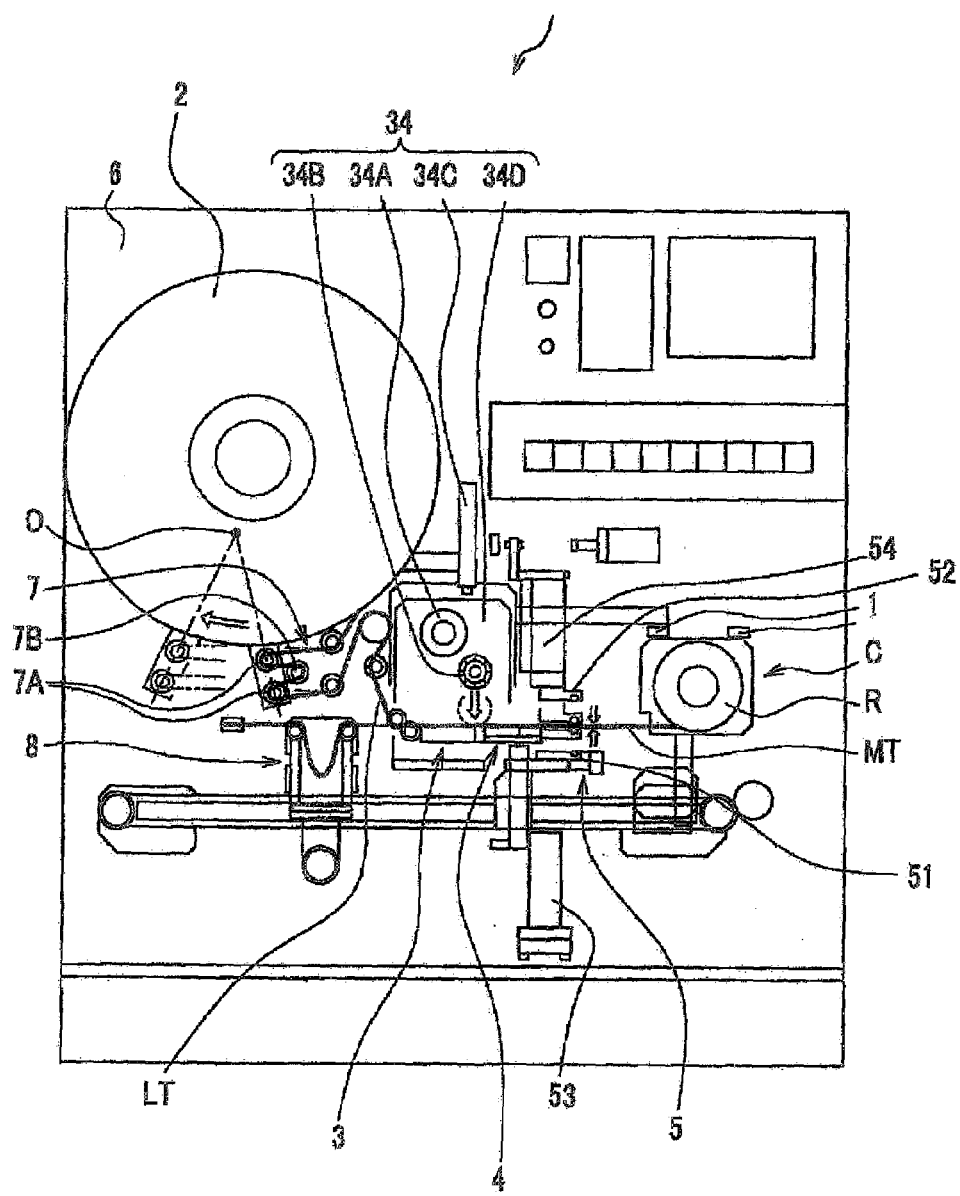
FIG. 1 is a schematic front view showing an entire structure of a device for processing an end portion of a tape recording medium according to one embodiment of the present invention.

In one embodiment of the present invention, a device for processing an end portion of a magnetic tape (hereinbelow, frequently referred to as "processing device A") is configured to join a leader tape LT to an end of a magnetic tape MT and to attach a leader pin LP to an end portion (pin attachment portion) of the leader tape LT on an assembly line of a magnetic tape cartridge C. In other words, the processing device A includes a "device for attaching a leader pin." Specifically, as shown in FIG. 1, the processing device A includes: a mount portion 1 for the magnetic tape cartridge C containing a reel R around which the magnetic tape MT is wound; a supply reel 2 around which the leader tape LT is wound; a splice mechanical part 3 for joining the end of the leader tape LT to the end of the magnetic tape MT; a transport suction mechanical part 4 for transporting the end portion of the leader tape LT to which the magnetic tape MT is joined; a damper mechanical part 5 for attaching the leader pin LP to the pin attachment portion of the leader tape LT (see FIGS. 5A-5C); and a panel 6 on which the above-mentioned components are mounted.

The mount portion 1 is located, for example, in the right middle area of the panel 6. The mount portion 1 is formed so that the magnetic tape cartridge C is removably mounted with the draw-out opening for the magnetic tape MT facing to the left bottom area. The supply reel 2 is disposed, for example, in the left upper area of the panel 6. Under the supply reel 2; rollers 7 are located for guiding the leader tape LT from the supply reel 2 to the splice mechanical part 3.

The guide rollers 7 include two swayable rollers 7A, 7A that can draw out the leader tape LT by a predetermined length from the supply reel 2 and guide the drawn-out leader tape LT to the splice mechanical part 3. Two swayable rollers 7A, 7A are formed so as to pivot on the center area of the supply reel 2 as a sway fulcrum O and move towards or away from a fixed roller 7B disposed between the swayable rollers 7A, 7A. By moving the swayable rollers 7A, 7A away from the fixed roller 7B, the leader tape LT can be drawn out from the supply reel 2 by a predetermined length; while by moving the swayable rollers 7A, 7A towards the fixed roller 7B, the predetermined length of the leader tape LT drawn out can be fed to the splice mechanical part 3.

The splice mechanical part 3 has functions of: cutting the magnetic tape MT drawn out from the reel R of the magnetic tape cartridge C mounted on the mount portion 1, and cutting the leader tape LT drawn out from the supply reel 2; butting a cut end (joint end) of the magnetic tape MT and a cut end (joint end) of the leader tape LT and joining the cut ends by means of a splicing tape; and cutting the joined leader tape LT by a predetermined length. The splice mechanical part 3 is located, for example, at the center of the panel 6, and includes a fixed suction block 31, a first movable suction block 32 and a second movable suction block 33, as shown in FIGS. 2 and 4A-4F. In addition, the splice mechanical part 3 includes a splicing tape application part 34, as shown in FIG. 1.

As shown in FIGS. 2 and 4A-4F, the fixed suction block 31 is short in machine direction, which has a guide groove 31A on the upper face thereof with a width corresponding to the width of the magnetic tape MT and the leader tape LT. On the bottom face of the guide groove 31A, a plurality of negative pressure suction pores H are provided for bringing the magnetic tape MT and the leader tape LT into contact with the bottom face of the guide groove 31A by negative pressure. Each negative pressure suction pore H communicates with a negative pressure source through a switching valve (not shown), and by controlling the operation state of the switching valve, supply of negative pressure for suction is switched between on and off. With this structure, the fixed suction block 31 can hold the magnetic tape MT and the leader tape LT by negative pressure, with each of the tapes MT and LT being properly positioned in transverse direction.

Figure 2:
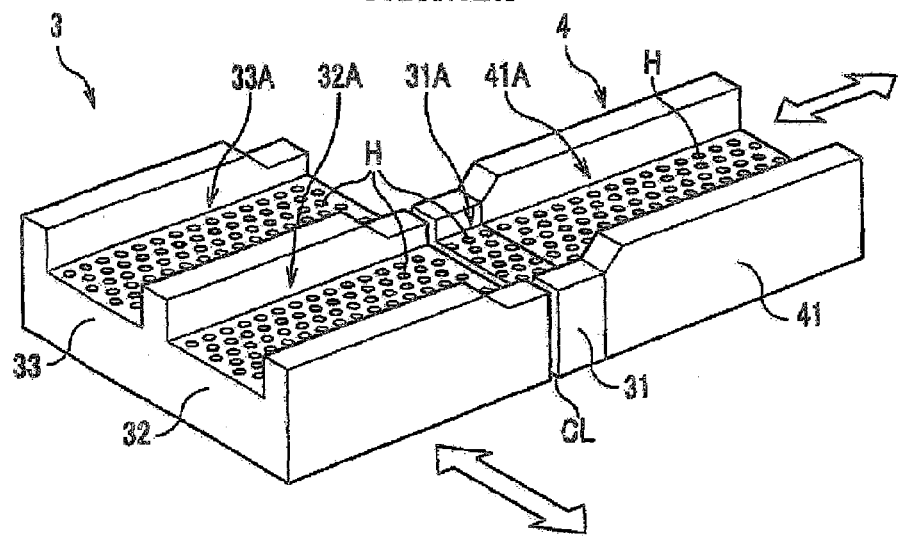
FIG. 2 is a perspective view showing structures of a fixed suction block, first and second movable suction blocks, and a transport suction block, which are components of a splice mechanical part and a transport suction mechanical part of FIG. 1.

Referring to FIG. 2, the first movable suction block 32 and the second movable suction block 33 are integrally parallelly formed side by side (in transverse direction of the tape). On the upper face, the blocks 32 and 33 have guide grooves 32A and 33A parallelly formed side by side, each having the same width and depth as the guide groove 31A of the fixed suction block 31. The movable suction blocks 32 and 33 are longer than the fixed suction block 31 in machine direction. On the bottom faces of the guide grooves 32A and 33A, a plurality of negative pressure suction pores H are provided which are similar to the negative pressure suction pores H provided in the fixed suction block 31. With this structure, the first movable suction block 32 and the second movable suction block 33 can hold the magnetic tape MT and the leader tape LT, respectively, by negative pressure, with each of the tapes MT and LT being properly positioned in transverse direction.

The first movable suction block 32 and the second movable suction block 33 integrally formed are disposed at one side of the fixed suction block 31 with a clearance CL for inserting a cutter in such manner that the groove 32A or 33A of the movable suction block 32 or 33 aligns with the groove 31A in the fixed suction block 31. The movable suction blocks 32 and 33 can reciprocate by means of an actuator, such as air cylinder (not shown), in transverse direction with respect to the direction of the grooves 32A and 33A, i.e. direction indicated by an arrow on the left side in FIG. 2. In other words, the movable suction blocks 32, 33 are formed in such manner that the first movable suction block 32 can shift the position thereof between a working position where the guide groove 32A aligns with the guide groove 31A of the fixed suction block 31 and a fallback position transversely next (on the front side in the drawing) to the working position. The second movable suction block 33 can shift the position thereof between a working position where the guide groove 33A aligns with the guide groove 31A and a fallback position transversely next (on the back side in the drawing) to the working position.

Figure 4A:
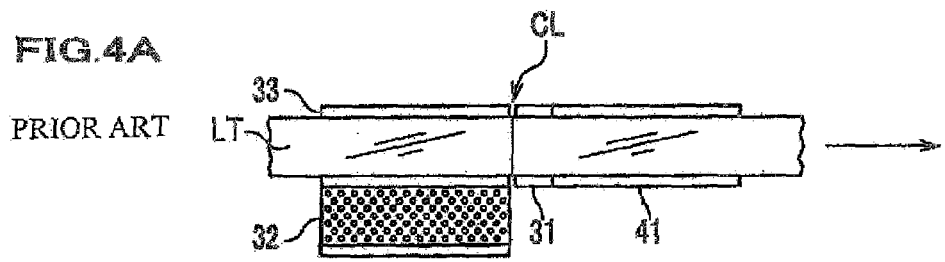
FIGS. 4A-4F are plan views stepwise explaining the operation of the fixed suction block, the first and second movable suction blocks and the transport suction block of FIG. 2.
Figure 4B:
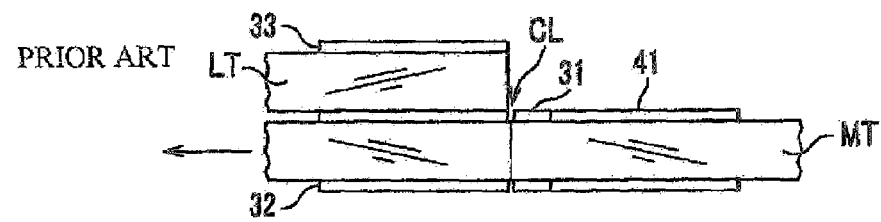
Figure 4C:
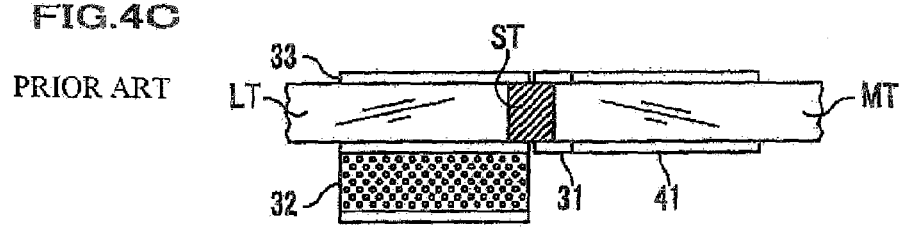

As shown in FIG. 1, the splicing tape application part 34 includes: a supply reel 34A around which a splicing tape (not shown) is wound; a suction roller 34B for winding a predetermined amount of the splicing tape from the supply reel 34A and holding a non-adhesive surface of the splicing tape by negative pressure; a cutter (not shown) for sequentially cutting the splicing tape held by the periphery of the suction roller 34B with negative pressure into a plurality of short splicing tapes ST as shown in FIG. 4C; and the like. These components are placed on a support panel 34D which is movable in vertical direction by means of an air cylinder 34C.

The periphery of the suction roller 34B is formed of a poromeric and elastic sponge-like material, which elastically supports a plurality of splicing tapes ST by negative pressure applied to the periphery. The suction roller 34B, together with the support panel 34D, is actuated downward by the air cylinder 34C. As a result, the adhesive surface of the short splicing tape ST held by the periphery of the suction roller 34B with negative pressure is elastically pressed to the area astride the boundary between the guide groove 31A of the fixed suction block 31 and the guide groove 33A of the second movable suction block 33.

The transport suction mechanical part 4 (which may be simply referred to as "suction mechanical part") has functions of: holding by negative pressure a portion of the leader tape LT cut by a predetermined length with the splice mechanical part 3, which portion is located near the free end but on the joint end side relative to the pin attachment portion, and transporting the leader tape LT. For this purpose, the transport suction mechanical part 4 has a transport suction block 41 (which may be simply referred to as "suction member") as shown in FIGS. 2 and 4A-4F. The transport suction block 41 is long in machine direction, which has a guide groove 41A on the upper face thereof with the same width and depth as that of the guide groove 31A of the fixed suction block 31. On the bottom face of the guide groove 41A, a plurality of negative pressure suction pores H are provided, like the negative pressure suction pores H formed on the bottom face of the guide groove 31A. The transport suction block 41 can be shifted by driving means, such as an air cylinder (not shown), between a beginning position where the transport suction block 41 butts one end of the fixed suction block 31, i.e. the position where the guide groove 41A connectively aligns with the guide groove 31A of the fixed suction block 31, and an end position where the transport suction block 41 is placed in the damper mechanical part 5 (see FIG. 1).

The negative pressure suction pores H of the transport suction block 41 is connected to the suction power control unit formed of a suction apparatus as a negative pressure source, a sensor, a control device and the like, which changes suction power to the leader tape LT or the magnetic tape MT mounted on the transport suction block 41 at a predetermined timing. The timing for changing suction power is controlled, for example, based on calculation by an arithmetic processing unit formed of a sensor, microprocessor and the like (not shown in the drawings).

Figure 3:
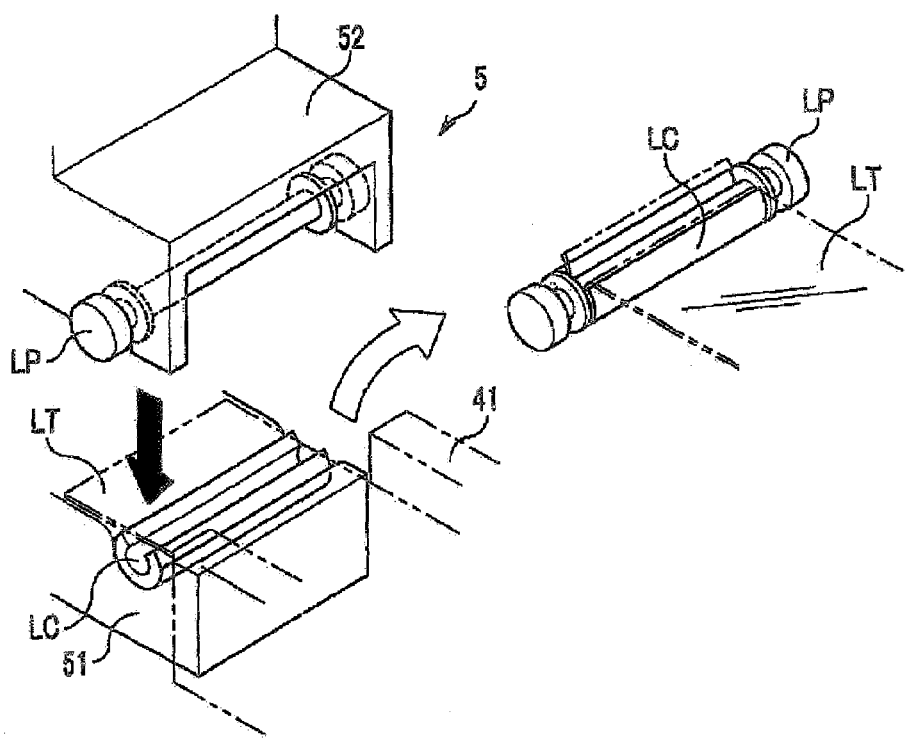
FIG. 3 is a perspective view showing a structure of the damper mechanical part of FIG. 1.

As shown in FIG. 3, the damper mechanical part 5 has a function of engaging the leader pin clip LC and the leader pin LP with the end portion of the leader tape LT (a predetermined length of the end portion) being sandwiched therebetween, which tape has been transported by the transport suction block 41 of the transport suction mechanical part 4. For this purpose, the damper mechanical part 5 is formed of a clip suction block 51 having an upper face for holding the leader pin clip LC by negative pressure and a leader pin suction block 52 having a lower face for holding the leader pin LP by negative pressure. The clip suction block 51 and the leader pin suction block 52 are disposed so as to face each other in vertical direction as shown in FIG. 1. The clip suction block 51 is supported by an air cylinder 53 in such manner that the clip suction block 51 can move upward; while the leader pin suction block 52 is supported by an air cylinder 54 in such manner that the leader pin suction block 52 can move downward. By lifting up the leader pin suction block 52 holding the leader pin LP with negative pressure and by lowering the clip suction block 51 holding the leader pin clip LC with negative pressure, the leader pin clip LC engages with the leader pin LP with the end portion of the leader tape LT (a predetermined length of the end portion) being sandwiched therebetween.

Though detailed explanation is omitted here, the processing device A according to one embodiment also includes, as shown in FIG. 1, a removal suction pod 8 for vacuuming and removing scrap pieces of the magnetic tape MT resulting from trimming by the splice mechanical part 3, located on the left side of the splice mechanical part 3 on the panel 6. Though not shown in the drawing, there is also provided a mechanism for drawing out the magnetic tape MT from the reel R of the magnetic tape cartridge C, to the left side of the removal suction pod 8 through the damper mechanical part 5, the transport suction mechanical part 4 and the splice mechanical part 3.

With respect to the processing device A having the above-mentioned structure according to one embodiment, as shown in FIG. 4A, the operation step starts from the following initial condition in which: the first movable suction block 32 of the splice mechanical part 3 is at the fallback position which is located in one of transverse directions (front side in the drawing) relative to the fixed suction block 31; the second movable suction block 33 is at the working position where the second movable suction block 33 is located adjacent to one end of the fixed suction block 31 with a clearance CL (see FIG. 2); and the transport suction block 41 of the transport suction mechanical part 4 is at the beginning position where the transport suction block 41 butts the other end of the fixed suction block 31.

First, the end portion of the leader tape LT is drawn out from the supply reel 2 by actuating the guide rollers 7 (see FIG. 1), and the end portion of the leader tape LT is drawn into the guide grooves 33A, 31A and 41A of the second movable suction block 33, the fixed suction block 31 and the transport suction block 41, as shown in FIG. 4A. Subsequently, negative pressure is applied to a plurality of negative pressure suction pores H formed at the bottom of the guide grooves 33A, 31A and 41A, and the end portion of the leader tape LT is brought into contact with the bottom of the guide grooves 33A, 31A and 41A by negative pressure, while being properly positioned in transverse direction. While this condition is maintained, a cutter (not shown) is inserted into the clearance CL between the second movable suction block 33 and the fixed suction block 31, so that the end portion of the leader tape LT is trimmed. As a result, a joint end to butt to the magnetic tape MT is formed on the leader tape LT held by the second movable suction block 33 with negative pressure.

Once the end portion of the leader tape LT is trimmed, supply of negative pressure to a plurality of the negative pressure suction pores H of the fixed suction block 31 and the transport suction block 41 is stopped and suction of the leader tape LT is cancelled. The scrap piece of the leader tape LT held by the fixed suction block 31 and the transport suction block 41 is removed by an appropriate means.

Subsequently, as shown in FIG. 4B, the second movable suction block 33 of the splice mechanical part 3 moves from the working position to the fallback position while holding a portion of the leader tape LT containing the joint end by negative pressure, which makes the first movable suction block 32 move from the fallback position to the working position. Then, the end portion of the magnetic tape MT drawn out from the reel R of the magnetic tape cartridge C (see FIG. 1) by the magnetic tape drawing-out mechanism (not shown) is pulled into the guide grooves 41A, 31A and 32A of the transport suction block 41, the fixed suction block 31 and the first movable suction block 32.

Next, by applying force by negative pressure to a plurality of negative pressure suction pores H formed in the bottom face of each of the guide grooves 41A, 31A and 32A, the end portion of the magnetic tape MT is held and properly positioned in transverse direction. While this condition is maintained, a cutter (not shown) is inserted into the clearance CL between the fixed suction block 31 and the first movable suction block 32, so that the end portion of the magnetic tape MT is trimmed. As a result, a joint end to butt to the leader tape LT is formed in the magnetic tape MT held by the fixed suction block 31 with negative pressure.

Once the end portion of the magnetic tape MT is trimmed, supply of negative pressure to a plurality of the negative pressure suction pores H of the first movable suction block 32 is stopped and suction of the magnetic tape MT is cancelled. The scrap piece of the magnetic tape MT held by the first movable suction block 32 is vacuumed and removed by a removal suction pod 8.

Subsequently, as shown in FIG. 4C, the first movable suction block 32 of the splice mechanical part 3 moves from the working position to the fallback position, which makes the second movable suction block 33 move from the fallback position to the working position with the joint end of the leader tape LT held by negative pressure. In this manner, the joint end of the leader tape LT held by the second movable suction block 33 with negative pressure can be butted to the joint end of the magnetic tape MT held by the fixed suction block 31 with negative pressure.

Then, the suction roller 34B of the application part 34 (see FIG. 1), together with the support panel 34D, is actuated downward by the air cylinder 34C, and the adhesive surface of the short splicing tape ST held by the periphery of the suction roller 34B is pressed to the end part of the magnetic tape MT and the end part of the leader tape LT in the guide groove 31A of the fixed suction block 31 and the guide groove 33A of the second movable suction block 33, respectively. In this manner, the splicing tape ST adheres to the end parts of the magnetic tape MT and the leader tape LT, so that the leader tape LT is joined to the magnetic tape MT.

Figure 4D:
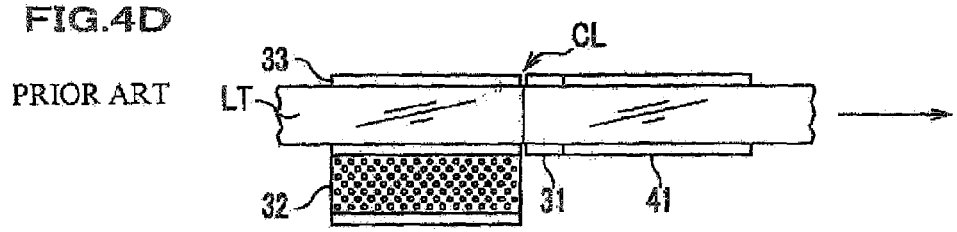

Once the leader tape LT is joined to the magnetic tape MT, supply of negative pressure to a plurality of the negative pressure suction pores H is stopped and suction of the magnetic tape MT on the transport suction block 41 and the fixed suction block 31, and of the leader tape LT on the second movable suction block 33, is cancelled. By rewinding a predetermined length of the magnetic tape MT around the reel R in the magnetic tape cartridge C shown in FIG. 1, the two swayable rollers 7A, 7A sway towards the fixed roller 7B. Then, as shown in FIG. 4D, a predetermined length of the leader tape LT is drawn into the guide grooves 33A, 31A and 41A of the second movable suction block 33, the fixed suction block 31 and the transport suction block 41, respectively (see FIG. 2).

Subsequently, by applying negative pressure to a plurality of the negative pressure suction pores H formed on the bottom faces of the guide grooves 33A, 31A and 41A, a predetermined length of the drawn-out leader tape LT is held again by negative pressure and properly positioned in transverse direction. While this condition is maintained, a cutter (not shown) is inserted into the clearance CL between the second movable suction block 33 and the fixed suction block 31, so that the leader tape LT joined to the magnetic tape MT is cut off by a predetermined length. Then, a joint end to the magnetic tape MT for the next operation is newly formed in the leader tape LT held by the second movable suction block 33 with negative pressure.

Figure 4E:
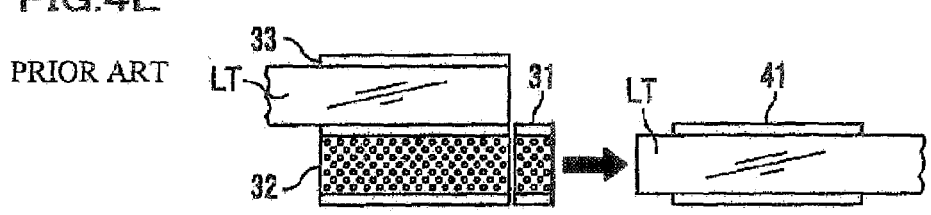
Figure 4F:
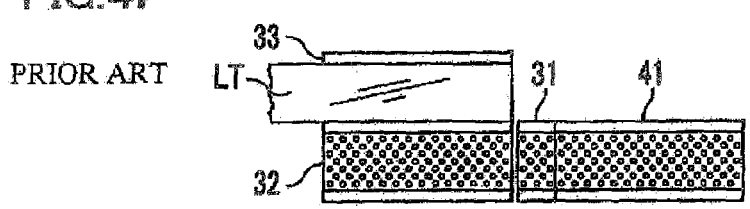

Then, as shown in FIG. 4E, the second movable suction block 33 of the splice mechanical part 3 moves from the working position to the fallback position with the leader tape LT held by negative pressure, which makes the first movable suction block 32 move from the fallback position to the working position. The supply of negative pressure to a plurality of the negative pressure suction pores H of the fixed suction block 31 is stopped and suction of the fixed suction block 31 is cancelled, which releases the free end portion of the leader tape LT. Then, the transport suction block 41 of the transport suction mechanical part 4 holds the portion in the vicinity of the end portion of the leader tape LT by negative pressure with a predetermined length of the end portion protruded. The transport suction block 41 is shifted from the beginning position to the end position by a driving means, such as an air cylinder (not shown), to thereby transport a predetermined length of the end portion of the leader tape LT to the damper mechanical part 5.

Referring to FIG. 3, once the end portion of the leader tape LT (a predetermined length of the end portion) is transported to the damper mechanical part 5, the leader pin suction block 52 holding the leader pin LP is actuated downward by the air cylinder 54, while the clip suction block 51 holding the leader pin clip LC is actuated upward by the air cylinder 53. As a result, the leader pin clip LC is engaged with the leader pin LP with the end portion (a predetermined length from the edge) of the leader tape LT being sandwiched therebetween, and the leader pin LP is attached to the end portion of the leader tape LT. The leader tape LT to which the leader pin LP is attached is rewound around the reel R of the magnetic tape cartridge C shown in FIG. 1. In this manner, joining of the leader tape LT with the magnetic tape MT of the magnetic tape cartridge C and attaching the leader pin LP to the leader tape LT can be effectively performed in sequence.

Next, a method for attaching a leader pin LP will be explained in reference to FIGS. 5A-5C, in which the leader pin LP is engaged with the leader pin clip LC in such manner that wrinkle is not formed on the end portion LTa of the leader tape LT protruding from the edge of the transport suction block 41.

Figure 5A:
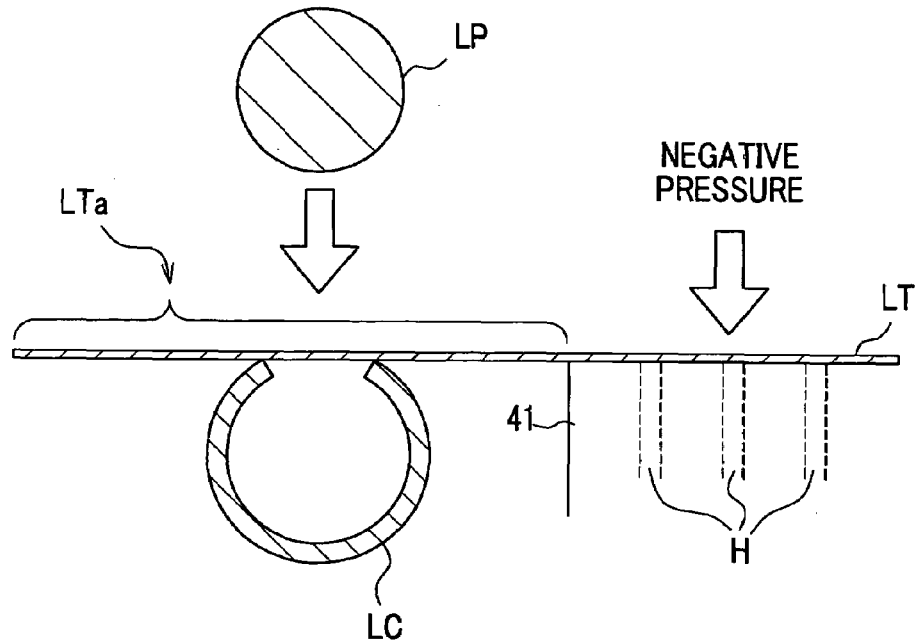
FIGS. 5A-5C are cross sectional views of the leader tape, a leader pin and a leader pin clip, stepwise explaining the engagement of the leader pin and the leader pin clip with the end portion of the leader tape being sandwiched therebetween.
Figure 5B:
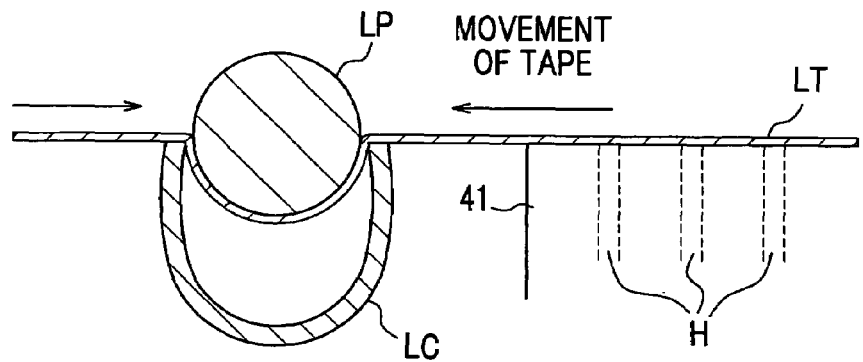
Figure 5C:
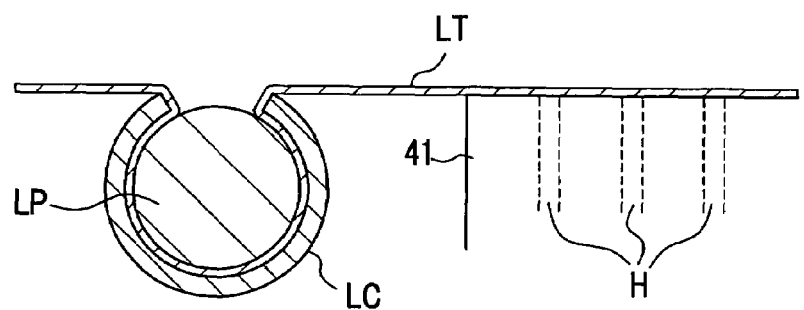
Figure 6:
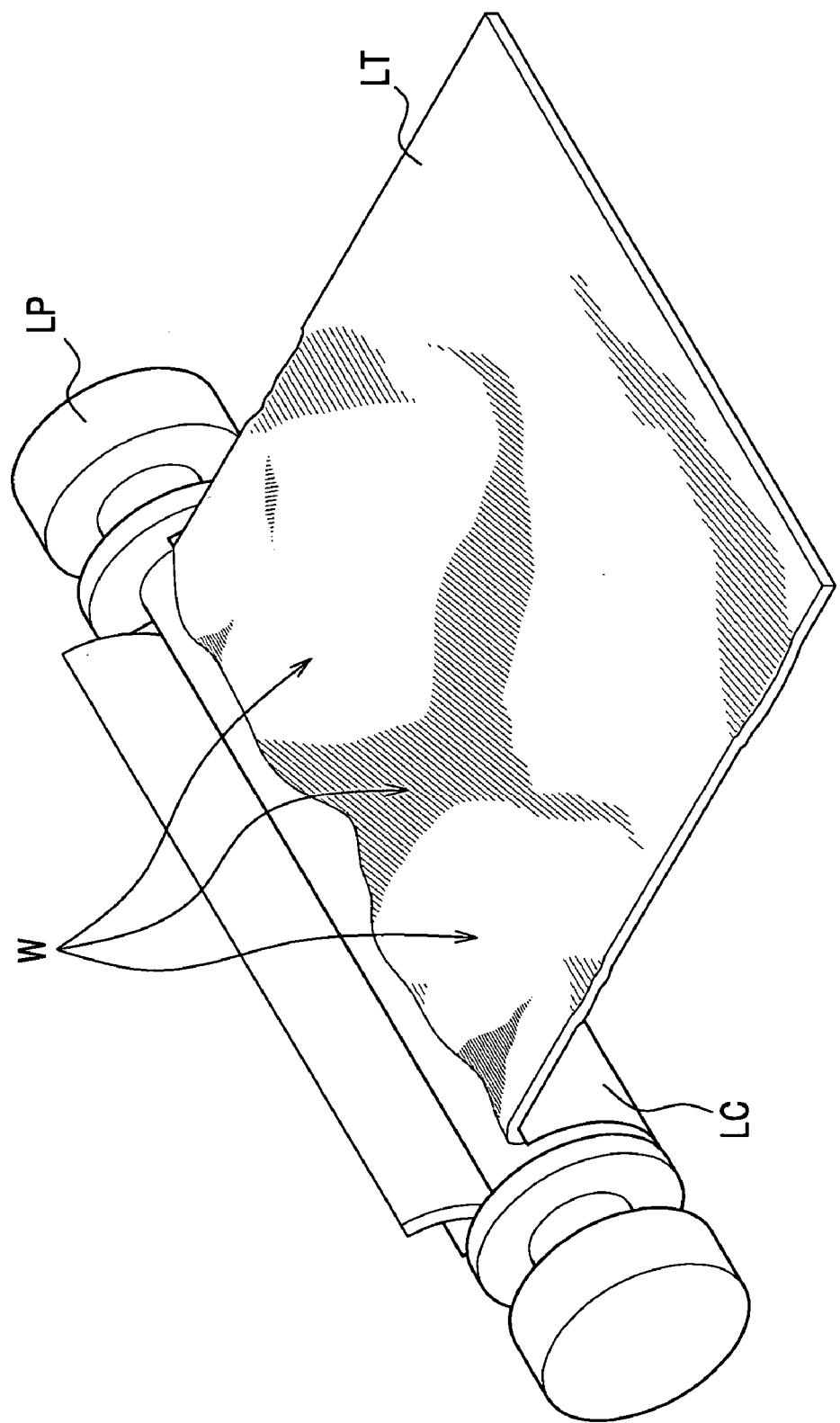
FIG. 6 is a perspective view showing a leader tape with a leader pin and a leader pin clip attached to the leader tape, with an end portion of the leader tape having wrinkle.

FIGS. 5A-5C are cross sectional views of the leader tape, the leader pin and the leader pin clip, stepwise explaining the engagement of the leader pin with the leader pin clip with the end portion of the leader tape being sandwiched therebetween.

First, as shown in FIG. 5A, the end portion LTa of the leader tape LT is disposed between the leader pin LP and the leader pin clip LC by means of the transport suction block 41 (step 1). The transport suction block 41 holds the leader tape LT with a power enough to hold the leader tape LT during transporting the leader tape LT.

When a sensor (not shown) detects that the end portion LTa of the leader tape LT is disposed between the leader pin LP and the leader pin clip LC, the suction power control unit connected to the negative pressure suction pores H lowers suction power of the transport suction block 41 in such manner that the pulling-resistance force imparted to the leader tape LT by the transport suction block 41 becomes slightly smaller than the tensile force applied to the leader tape LT by pulling force caused by the engagement of the leader pin LP with the leader pin clip LC. The suction power of the transport suction block 41 is preferably adjusted to obtain the pulling resistance force of 0.3 N -1.4 N, as elucidated from Examples below, and more preferably approximately 0.9 N, which is nearly the median value thereof.

It is desirable that preliminary experiment be conducted to obtain the relationship between suction power and the pulling-resistance force. It is preferred that the relationship obtained in the preliminary experiment be stored as a plotted map in memory of the suction power control unit for utilizing the data in controlling the suction power.

When the suction power of the transport suction block 41 is adjusted, the leader pin LP begins to approach the leader pin clip LC and the leader tape LT (step 2), as shown by an arrow on the left side in FIG. 5A. It should be noted that the adjustment of the suction power can be conducted in a short period of time, as short as approximately 0.1 second, and therefore the adjustment of the movement of the leader pin LP to the leader pin clip LC and suction power can be conducted at the same time.

When the leader pin LP begins to fit in the groove of the leader pin clip LC as shown in FIG. 5B, the leader tape LT is pulled towards the leader pin LP (or the leader pin clip LC) by the amount defined as a difference between the length of the leader tape LT brought into contact with the leader pin LP and the opening width of the groove of the leader pin clip LC. To put it another way, tensile force is applied to the leader tape LT.

In this situation, the pulling-resistance force, which is slightly smaller than the tensile force applied to the leader tape LT, is imparted to the leader tape LT by the transport suction block 41. For this reason, the leader tape LT moves towards the leader pin LP (or the leader pin clip LC) while maintaining an appropriate tension.

In the last step, the leader pin LP fits in the groove of the leader pin clip LC as shown in FIG. 5C. Since the leader tape LT is moved, tensile force on the leader tape LT is reduced, and therefore the leader tape LT is prevented from being subject to unexpected torsion or deformation. In other words, excessive tensile force on the leader tape LT, and thus wrinkle formation on the leader tape LT, are prevented.

EXAMPLES

The present invention is illustrated in the following Examples in which the device for attaching a leader pin and the method for attaching a leader pin are applied to a conventional leader tape having nearly equal elastic coefficients in machine direction and transverse direction, and a recent leader tape having a smaller elastic coefficient in transverse direction than in machine direction.

First, differences in physical properties of the conventional leader tape and the recent leader tape are explained.

Table 1 shows summary of physical properties of the conventional leader tape and the recent leader tape.

As is apparent from Table 1, the recent leader tape has larger difference in elastic coefficient between machine direction (MD) and transverse direction (TD), as compared with the conventional leader tape. In order to prevent "reel fold," a larger surface roughness is given to the recent leader tape. It should be noted that the width of both the conventional and recent leader tapes is ½ inch.

TABLE 1

| Properties | Unit | Conventional leader tape | Recent leader tape |
|---|---|---|---|
| Total thickness | μm | 17.0 | 17.1 |
| Elastic coefficient (MD/TD) | mg | 146/138 | 184/144 |

TABLE 1-continued

| Properties | Unit | Conventional leader tape | Recent leader tape |
|---|---|---|---|
| Surface roughness (magnetic layer side) | nm | 3.8-4.6 | 23.8 |
| Surface roughness (base side) | nm | 8 | 29.4 |

In the case where the conventional leader tape was used, when difference in misalignment of the leader pin relative to the leader pin clip (caused by movement of the clip suction block 51 and the leader pin suction block 52) was set as small as possible, and when the suction power was set to impart pulling-resistance force of approximately 4.1 N to the leader tape, wrinkle formation was prevented.

Accordingly, in the following Examples, misalignment of the leader pin relative to the leader pin clip was set larger than the conventional case (for example, tilted leader pin is brought to fit in the leader pin clip), to thereby form wrinkle even in the case of the conventional leader tape. Under this condition, suction power of the transport suction block 41 was adjusted so that pulling-resistance force applied to the leader tape changed in 5 stages (5.9 N, 4.1 N, 2.1 N, 1.4 N and 0.3 N).

Example 1

In this Example, the recent leader tape having properties shown in Table 1 was used. The pulling-resistance force during the transport of the leader tape was set at 4.1 N, and the pulling-resistance force during the engagement of the leader pin and the leader pin clip was changed in 5 stages, as described above. As a result, when the pulling-resistance force was set at 1.4 N and 0.3 N, wrinkle formation at the end portion of the leader tape LT was prevented.

It is also found in this experiment that time required for changing the pulling-resistance force caused by suction power of the transport suction block 41 from 4.1 N to 1.4 N was approximately 0.1 second, and therefore the change of pulling-resistance force does not affect working efficiency.
(Example 2)

In this Example, the conventional leader tape having properties shown in Table 1 was used. The pulling-resistance force during the transport of the leader tape was set at 4.1 N, and the pulling-resistance force during the engagement of the leader pin and the leader pin clip was changed in 5 stages, as described above. As a result, when the pulling-resistance force was set at 2.1 N, 1.4 N and 0.3 N, wrinkle formation at the end portion of the leader tape LT was prevented.

The results are shown in Table 2.

TABLE 2

| Pulling-resistance force | Example 1 (recent leader tape) | Example 2 (conventional leader tape) |
|---|---|---|
| 5.9 N | X | X |
| 4.1 N | X | X |
| 2.1 N | X | ○ |
| 1.4 N | ○ | ○ |
| 0.3 N | ○ | ○ |

○: no wrinkle
X: wrinkle present

As is apparent from the above experiments, by selecting smaller pulling-resistance force for the leader tape and allowing the leader tape to move towards the leader pin during the engagement of the leader pin with the leader pin clip, wrinkle formation can be prevented.

The embodiment of the present invention has been described above with reference to the drawings. However, the present invention should not be limited to the above embodiment, and it is a matter of course that the above embodiment may properly be modified without departing from the scope of the present invention.

For example, in the present embodiment, the leader tape LT is moved in machine direction by adjusting suction power of the transport suction block 41. However, the present invention should not be limited to this embodiment, and the leader tape LT may be moved towards the leader pin LP together with the transport suction block 41.

Specifically, it is preferred that the transport suction block 41 be elastically supported by elastic body, such as rubber and spring, so that the transport suction block 41 moves towards the leader pin LP when the end portion of the leader tape LT is disposed between the leader pin LP and the leader pin clip LC.

Moreover, in the case where an air cylinder is used for moving the transport suction block 41, the transport suction block 41 may be actuated by the air cylinder at the same time when the leader pin is engaged with the leader pin clip. Further, the transport suction block 41 may be actuated by a positioning unit other than air cylinder, for example ball screw, during engagement.

In the above-mentioned embodiment, suction power of the transport suction block 41 is made small during the engagement of the pin attachment portion of the leader tape with the leader pin LP, as compared with the suction power of the transport suction block 41 during the joining of the leader tape LT to the magnetic tape MT and during the transport of the leader tape LT. However, the present invention is not limited to this embodiment, and also during the joining of the leader tape LT to the magnetic tape MT and during the transport of the leader tape LT, the leader tape LT may be held by negative pressure of a magnitude that allows the leader tape LT to move in machine direction by tensile force caused by the engagement of the leader pin LP with the leader pin clip LC, as long as the leader tape LT is not misaligned to or not detached from the transport suction block 41.

In the above-mentioned embodiment, the processing device A is formed of a combination of the device for joining magnetic tape and leader tape and the device for attaching leader pin. However, the present invention should not be limited to this embodiment, and the processing device A may be formed solely of the device for attaching leader pin.

In addition, there is no limitation with respect to the leader tape, as long as the tape can be joined to the end of the magnetic tape for drawing out from the cartridge. For example, a tape with non-magnetic layer on both sides thereof may be used, or a tape with magnetic layer on one side may be used.

It is matter of course that the splice mechanical part of the processing device A according to the present embodiment (see FIG. 2) is merely one illustration, and there is no limitation as long as the leader tape and the magnetic tape can be joined together.

In the above-mentioned embodiments, magnetic tape is used as a tape type recording medium. However, the tape type recording medium is not limited to magnetic tape and it may be optical tape or the like.

What is claimed is:

1. A device for attaching a leader pin to a pin attachment portion of a leader tape having a joint end and a free end opposite to the joint end, which joint end is to be joined to a joint end of a tape type recording medium and which pin attachment portion is located in the vicinity of the free end, the device comprising:
- a suction mechanical part configured to hold a portion of the leader tape by negative pressure, which portion is located on the joint end side relative to the pin attachment portion;
- a clamper mechanical part configured to engage the leader pin and a leader pin clip with the pin attachment portion of the leader tape being sandwiched therebetween, wherein
- the suction mechanical part holds the leader tape in such manner that the leader tape is allowed to move in a longitudinal machine direction during the engagement of the leader pin and the leader pin clip with the pin attachment portion of the leader tape being sandwiched therebetween.

2. The device according to claim 1, wherein the suction mechanical part holds the leader tape with a suction power that generates a predetermined pulling-resistance force when the leader tape is pulled in machine direction.

3. The device according to claim 2, wherein the predetermined pulling-resistance force is 0.3-1.4 N.

4. The device according to claim 2, further comprising a suction power control unit that controls the suction power to generate the predetermined pulling-resistance force.

5. The device according to claim 1, further comprising a leader tape that has a larger elastic coefficient in the machine direction than in a direction transverse thereto.

6. The device according to claim 5, wherein the leader tape has an elastic coefficient in the transverse direction of 0.95-0.78, taking the elastic coefficient in the machine direction as 1.0.

7. The device according to claim 5, wherein the leader tape has a surface roughness of 10-60 nm.

8. The device according to claim 5, wherein the leader tape has a thickness of 5-20 μm.

9. The device according to claim 1, which further comprises an elastic body configured to support the suction mechanical part elastically and movably in the machine direction of the leader tape,
- the elastic body having an elastic coefficient that allows the elastic body to elastically support the suction mechanical part while maintaining a predetermined tensile force generated on the leader tape during the engagement of the leader pin and the leader pin clip with the pin attachment portion of the leader tape being sandwiched therebetween.

10. The device according to claim 9, wherein the predetermined tensile force is 0.3-1.4 N.

11. The device according to claim 1, which further comprises a transport mechanism configured to transport the suction mechanical part in the machine direction of the leader tape,
- the transport mechanism transporting the suction mechanical part while maintaining a predetermined tensile force generated on the leader tape during the engagement of the leader pin and the leader pin clip with the pin attachment portion of the leader tape being sandwiched therebetween.

12. The device according to claim 11, wherein the predetermined tensile force is 0.3-1.4 N.

13. The device according to claim 1, wherein said suction mechanical part imparts to the leader tape a pulling-resistance force that is smaller than a tensile force applied to the leader tape by a pulling force caused by said engagement.

* * * * *